Aug. 22, 1944.   J. LOHSE   2,356,524
METHOD OF DIRECTLY PRODUCING PIG IRON AND STEEL
Original Filed Oct. 26, 1940   3 Sheets-Sheet 1

Inventor
Julius Lohse,
By
Attorney

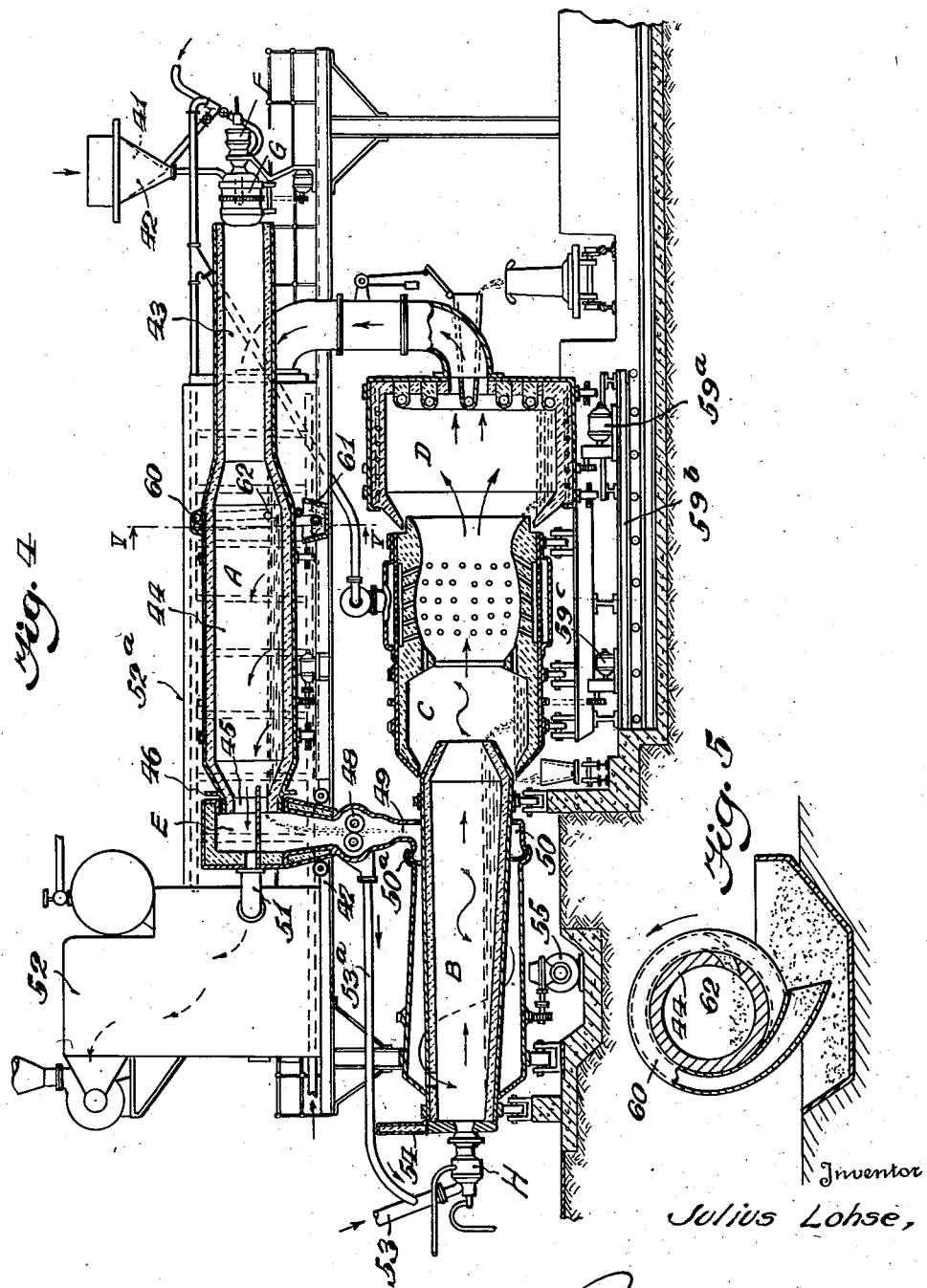

Patented Aug. 22, 1944

2,356,524

UNITED STATES PATENT OFFICE 2,356,524

METHOD OF DIRECTLY PRODUCING PIG IRON AND STEEL

Julius Lohse, Berlin-Wilmersdorf, Germany; vested in the Alien Property Custodian Original application October 26, 1940, Serial No. 363,041. Divided and this application July 14, 1941, Serial No. 402,276. In Germany April 4, 1936

8 Claims. (Cl. 75—40)

My present application constitutes a division of my co-pending application Serial No. 363,041 filed October 26, 1940, patented March 14, 1944, No. 2,344,440. The invention disclosed in my present application relates to a method for directly producing pig iron and steel from ores, and has for its object to provide improvements according to which a finished product may be made by applying operations that follow one another in a continuous process.

The present invention eliminates the many drawbacks attendant upon the production of pig iron and steel by the present known methods, by producing pig iron and steel in a single plant and in closely interrelated operations from material prepared by predrying, roasting, sintering, etc., both fine and coarse material being heated and in a reducing flame and smelted to form pig iron and slag. While smelting is going on and material accumulates, slag is continually removed and the liquid iron below the slag drawn off in the form of a shallow stream and, if steel is to be made, fined through an interchangeable converting zone, desulphurized still more and dephosphorized.

By having all operations directly follow one another in the order mentioned and carrying them out in a chamber through which flame heat continuously passes the carrying out of the process is greatly facilitated, principally because of the freedom from heat losses such as occur in those processes where the procedure involves transferring the molten mass in open receptacles from one treatment chamber to another. According to my invention, each operation in this arrangement is so adjusted and timed to all others that iron may be continuously produced from pretreated coarse and fine charges. From the point of view of both thermal economy and continuous plant operation, one operation is related to the other, so that by the proper adjustment of quantity and speed high quality of the final product is insured. The smelting and refining method according to my invention is initiated by smelting in one or more flames which rotate in a direction oppositely to that of the furnace and thus sweep along the furnace wall, the screened fine stuff being fed to the burner and the coarse material charged directly to the hearth.

The application of a long and continually rotating flame prevents the wall of the furnace from being destroyed by a flame jet having a fixed direction and also causes, together with the radiant heat of the furnace, resmelting and removal of caked deposits which tend to form from centrifugal action as a result of the rotation of the furnace. Due to the inclination of the furnace, the molten mass slowly moves in the direction of the next operation. In this way, steady discharge of the liquid material is effected without subjecting the furnace wall to excessive stresses or causing obstructions to form through cooling and caking of deposits. The molten masses accruing from the furnace walls and the metallic drops produced by the flames are collected along the lowest line of the inclined furnace and to the thin bath the preheated coarse charge material is directly added, as stated, and is quickly smelted under the triple effect of the action of the flame, heat radiation, and heat transmission from the furnace wall until pig iron and slag are produced and collected in special compartments.

The liquified masses continually flowing out of the rotary smelting chamber collect in a subsequent chamber of the rotary furnace plant. Here, the slag is flowed off, and the pig iron is passed in a shallow stream over a drum unit fitted with nozzles where it is blown during its passage and then collects in a connecting rotary refining chamber which may be equipped with special, for instance electric inductive, heating.

From the charge to the finished product the production of pig iron and steel proceeds uninterruptedly without heat losses and without requiring interposed conveying operations.

In further evolution of my invention it is possible to include also the pretreatment of the ores comprising the predrying, roasting, calcining and reducing operations, in the continuous process and thereby to extend the thermal and manufacturing advantages afforded by my process to the necessary preliminary treatment steps enumerated. With this object in view the multidrum rotary furnace plant on which my process is based is developed so that the interconnected revolving drums are arranged partly in parallel relation and partly on a common axis. The further steps of the process consist in subjecting the ores with the aid of an auxiliary burner in a rotary furnace, to drying, roasting, calcining, then reduction by the continual addition of coal, conveying the pretreated ores in an uninterrupted stream to the smelting chamber through a closed transition chamber within which any caked portion of the material may be broken up, and then successively smelting it, removing the slag therefrom, refining it, recarburizing it under the action of superheat, and alloying the product if desired. Due to the fact that the heat to be expended for pretreatment in the parallel arranged rotary drum passes through a closed path, particularly in as much as the heat is retained by the solid substances, and by the smelting chamber, not only are there avoided heat losses which otherwise would have to be compensated for within the smelting zone, but a steady rise in temperature of pig iron is attained, with all the favorable effects upon roasting, calcining, reduction and the rapid dropping out of liquid metal portions from the pretreated ores. In order to separate, at the start, the water vapors developing in the predrying chamber and the carbon dioxide gases produced in the reduction chamber, from the reduced ore, and to prevent them from reacting upon the ore and thus causing reoxidation, provisions are made to remove them at once and to pass them for further utilization of their heat to a waste heat vessel, etc. The arrangement may further be such that below the disintegrator disposed in the closed transition chamber, a connecting pipe leads to the coal dust pipe opening into the main burner so as to cause the powdered particles leaving the disintegrator to be directly drawn into the flame by suction effect produced in the main burner.

The invention is illustrated by way of example in the accompanying drawing, in which Fig. 1 shows an axial longitudinal section of a rotary furnace plant for carrying out the method according to my invention;

Fig. 4 shows a rotary furnace plant according to my invention including the pretreating steps; and Fig. 5 is a cross section along the line V—V, of Fig. 4.

Figure 1:
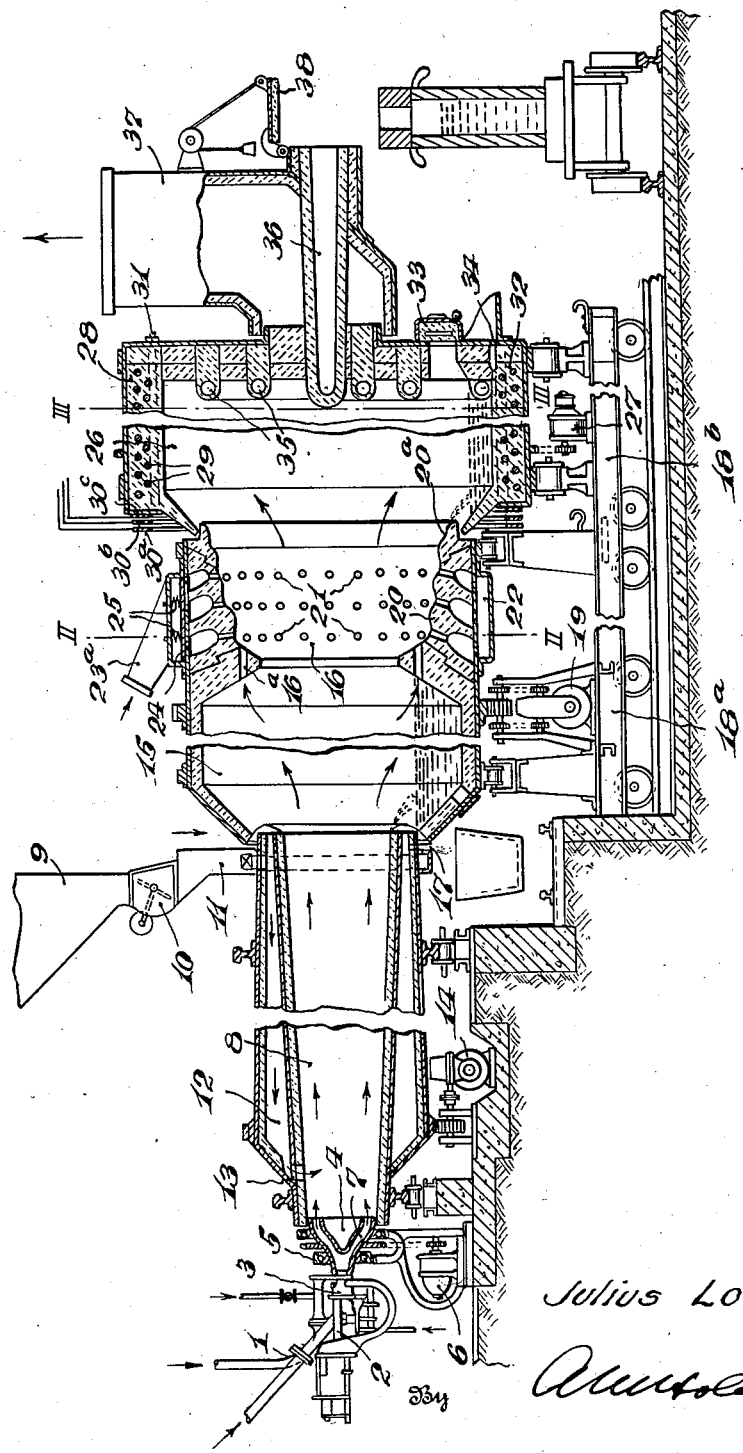

According to the present process the constituents of a calculated charge are reduced or disintegrated to a grain size of 25–30 mm. and the fine stuff below 10 mm. is screened off. The material below 10 mm. is ground in a suitable fine grinding mill, not shown, to cement fineness and is blown to the lateral tube 1 of the burner 2. Having been thoroughly mixed in a burner nozzle 3 with compressed air of 5–6 atmospheres' pressure, and heating oil of 40 atmospheres' pressure, or fuel gas of a pressure of 5–6 atmospheres, the fine material is thrown, for instance, by means of a rapidly revolving worm, not shown, into the heater 4 running on roller or ball bearings 5 and rotated by means of an electric motor 6. The wall of the heater 4 is provided with a highly refractory lining and possesses channels 7 like the vanes of a turbine into which the gases are directed, whereby whirling flames are produced which pass along the slowly revolving refractory brick lining of the presmelter 8, so that the heat is mainly transmitted by contact, and radiation has only an indirect effect. There is produced, however, chemico-physical actions and phenomena within the flame itself, such, for instance, as the escape of water of crystallization, the combustion of the sulphide sulphur to form sulphurous acid, the release of carbonic acid as a result of calcination, and decomposition of the fuel oil, and the reduction of the metals present, since the operation proceeds without excess air. Finally, metal droplets covered by slag form in the flames of the presmelter 8, drop to the inclined bottom thereof and run off.

Simultaneously, the granular material of 30–10 mm. screen size is conveyed from a storage hopper 9 through a pendulum feeder 10 and feeder shovel 11 to a drying and preheating jacket 12 of the presmelter 8, and after dropping into the latter through a wide slot 13, is heated from above and below by the very hot furnace walls and the radiating flames and generally treated in the manner described above, but at the speed of the slowly moving furnace and not at that of the gas stream. The length of the presmelter 8 is designed for operation at furnace speed, which is facilitated and rendered free from trouble by a regular motor drive 14 and the long flame produced by the burner. At the overflow lip of the presmelter 8 the molten masses flow into the second furnace unit comprising two sections, viz. a collector and a mixer 15 and a purifying compartment 16, the collector and mixer 15 being of sufficient size and depth to insure sharp, separation of slag and pig iron. The slag floats on top of the molten iron and continually flows, as at 17, over the edge of the tapered end of the collector 15 into cars which convey the slag to a waste-dump, though it is also possible to provide in known manner for granulation by air or water. A taphole 17' is provided to permit discharge of the pig iron to a bed near the furnace, if a portion of the accruing pig iron is to be sold as pigs. The taphole 17' is of importance also in case of needed repairs to provide for quick removal of the accumulated iron prior to moving the members 15 and 16 by means of the travelling platforms 18a, 18b. The pig iron which has been thoroughly heated in the collector 15 and thoroughly mixed due to the rotation of the drum driven by a motor 19, gradually rises to a certain level and flows through channels 16a preferably of square section and provided in the dam stone partition and leading into the fining compartment 16.

The compartment 16 is formed to have annular stone corrugations 20 provided with nozzles and also a terminal lipped corrugation 20a. These corrugations 20 form an inner terraced face for the furnace shell, and the corrugations form annular channels which at regular intervals open into a large number of nozzle holes 21. Around the portion having the nozzle holes is an outer furnace jacket made of strong boiler plate which is correspondingly perforated and on its outside turned and ground over a certain width. This ground surface is surrounded by a two-part cast iron wind box 22 provided with stuffing boxes 23 and a supply connection 23a for air, air enriched in oxygen, etc. The perforated portion of the outer furnace jacket is covered to the extent of approximately three-fourths of its circumference by a thin resilient steel band 24 which is lightly forced against the rotating furnace jacket underneath by springs 25. The lipped end or terminal corrugation 20a guides the pig iron into the third space 26 in which refining occurs.

The metallurgical operations in the fining space 16 are as follows:

The pig iron containing numerous impurities, as sulphur, phosphorus, carbon, and slag inclusions, flows slowly through the square channels 16a and over the annular channels formed between the corrugations 20, arranged one below the other in terrace fashion, in a uniform thin stream and is subjected from below to the action of a blast of air rich in oxygen which may be supplied to the tuyères by a compressor of an oxygen plant, not shown. The sulphur content, partly removed already in the presmelter 8, is now completely eliminated through the action of oxygen, and in the same way phosphorus is removed. The waste gases may be utilized in the usual way for heating purposes. Finely ground lime powder may be blown into the tuyères in known manner, whereby calcium sulphide or calcium phosphates will be formed. The slag together with the decarburized steel floats to the third furnace space 26 and after an electro-thermal treatment designed to remove traces of phosphorus and sulphur is discharged through a tap-hole and filled into cars.

The third or refining furnace space 26 into which flows the steel decarburized in the fining space 16, is rotated by a motor 27 and rests with its sets of rollers and turning means on the traveling platform 18b. The traveling platforms 18a, 18b, are interconnected by a suitable separable coupling, so that in case of repairs to be made on the end walls of the chamber 26 or the electro-thermal heating system thereof the chamber may be uncoupled and drawn out as far as required. The refining space 26 possesses a strong sheet metal furnace jacket having a silica brick lining 28 laid on a heat insulating support and provided with grooves. On this silica lining 28 are wound several layers of strong copper rope 29, which are electrically separated from one another. The ropes represent therefore coils and are connected to strong copper slip rings 30a, 30b, 30c disposed outside the furnace. The electric heating system described by way of example represents a high frequency furnace, which is operated at three-phase or alternating current of medium or high frequency. The metal bath is heated from above by the burner gases, from the side by the radiation of the revolving front face of the furnace and from below by the induced bottom currents.

Figure 3:
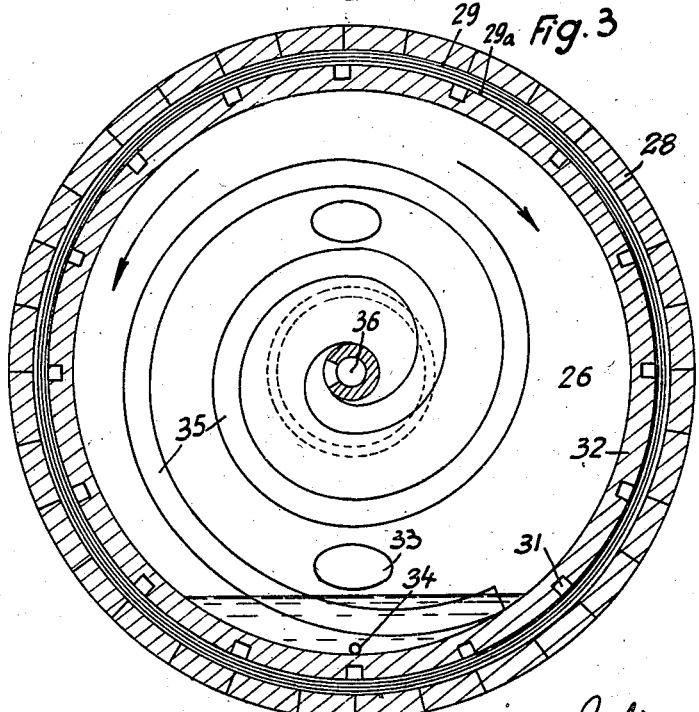

With the aid of this device chemico-metallurgical refining can be performed as in the known induction furnaces with respect to recarburization and the production of alloy steels. Substances required for refining are introduced through a door 33 below which an auxiliary taphole 34 with spout is provided, though a finished charge is usually discharged by turning the furnace in a clockwise direction, seen from the front, whereas during the heating and filling turning in the other direction is required, as indicated in Fig. 3. Automatic discharge for pouring, or filling iron molds placed on a casting bogie, is effected for instance by means of a worm 35 built up of highly refractory hollow bricks and inserted in the end wall in the form of an Archimedean spiral. The worm 53 discharges into a conical outlet pipe 36, also consisting of a refractory material and exchangeably arranged in a waste heat connection 37 which does not participate in the rotation. A flap 38 normally closes up the outlet 36. The elbow 37 may be connected to a waste heat boiler not shown and equipped with induced draft chimney and flue dust catcher. The casting worm 35 and the discharge pipe 36 are uniformly heated from the furnace because of their position so as to avoid harmful elongation. The heating of the furnace space 26 by fuel gases and bottom currents effects a perceptible saving in current compared with all types of known electric furnaces, which saving is due to the arrangement of the three furnace spaces in the manner described to form a unitary structure.

The not inconsiderable amounts of waste heat can be utilized for boiler operation or in any other suitable manner.

The rotary furnace plant shown in Figs. 4 and 5 embraces, in addition to the production of pig iron and steel, the pretreatment of the ores.

Figure 2:
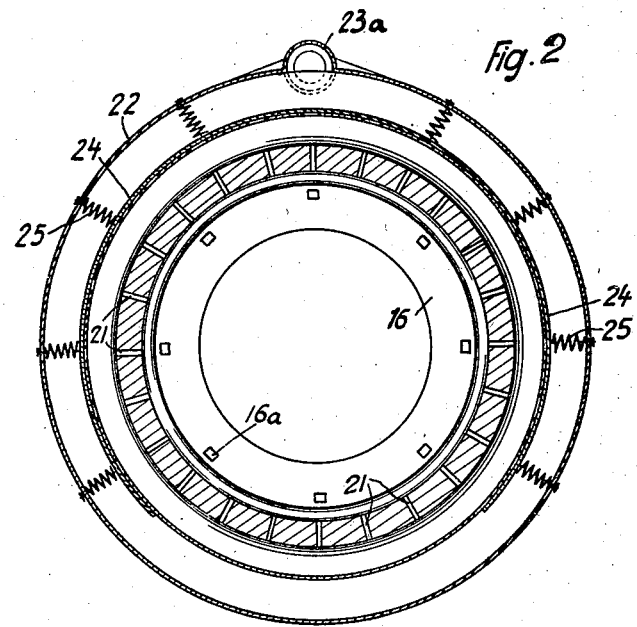
Figs. 2 and 3 are cross sections along the lines II—II and III—III, respectively, of Fig. 1.

The upper furnace drum A serves for pretreating the fine and coarse ores, and the lower directly connected drums B, C and D arranged on a common axis are used for obtaining the finished product. The upper and lower drums are connected by a closed transition chamber E. At the upper end of the drum A an auxiliary burner F and a rotating flame head G are provided, and the upper end of the lower series of drums is fitted with a main burner H adapted to be rotated and swung. Those parts of this furnace plant serving for the direct production of the finished product from pretreated ores have been described already in connection with Figs. 1–3.

The pretreating drum A is supplied with fine ore from the hopper 41 through the burner F and with coarser material from the hopper 42 through the rotating flame head G. Due to the action of the flame of the auxiliary burner F, the fine and coarse ores pass into the drying, roasting and calcining zone of a chamber 43 integral with, and leading into, a chamber 44 of enlarged diameter, in which a reducing zone is formed. At the point of transition between these two zones 43 and 44 reduction coal is supplied by a device which, as can be particularly clearly seen in Fig. 5 comprises a helical track 60 connected with the outer circumference of the drum A, opening with a radial orifice outside the drum A and, during rotation thereof, passing through a filling receptacle 61. An opening 62 of the track 60 at the other end lies within the inner wall of the drum A. When the latter revolves in the direction of the arrow, the helical channel 60 on passing through the receptacle 61 picks up reduction coal which, during further rotation of the drum moves through the opposite opening 62 under the ore bed in the drum A, which bed gradually advances from the higher to the lower end of the drum. The length of the reducing chamber 44 is so dimensioned relative to that of the roasting and calcining chamber 43 that a continuous sequence of operations up to the contracted outlet end 45 of the reducing chamber 44 is obtained, the latter opening with interposed sealing means 46, into a closed chamber E. The chamber E is movably supported on rails 47 and is fitted below with a redisintegrator 48 and a down pipe 49 which communicates with the preheating space of the presmelting furnace B through an annular entering member 50 provided with packing means 50a. The gases formed in the reduction furnace A carry valuable waste heat and are guided through a pipe 51 to the combustion space of a waste heat boiler 52, and the protective arch 51a serves for preventing reoxidation of the treated material and insures safe discharge.

The furnace head or port of the drum B supports the main burner H which can be moved so that it will cover with the flame the inner wall of the smelting drum B in an axial direction to prevent the formation of deposits. From below the disintegrator 48 a piping 53a leads to the coal dust supply piping 53 of the burner H, so that the powdery matter produced in the disintegrater 48, owing to the suction developed in the burner, is directly conveyed in a state of suspension to the flame. The main burner H is secured to the furnace door 54, capable of being lowered and raised, so as to render the furnace head accessible for repairs. The rotary drum B is driven by a separate motor 55 and discharges, under the action of the main burner H, the liquid metal from the pretreated ores, which then passes to the lower end and into the first compartment of the two-compartment drum C whence the slag can be rearwardly removed as indicated in the drawing and the collected pig iron is exposed to the blast in the central portion in a shallow stream before it enters the refining unit D, in which, by superheating and induced currents, the remaining sulphur and phosphorus, through the addition of quicklime, etc., are separated in the form of slag, and recarburization and possibly also alloying may take place. The waste gases developed during these steps and also in the compartments B, C, D pass through a hot blast stove 52a arranged in front of the waste heat boiler 52. The parts C and D are separately driven by a three-phase motor arrangement 59, 59a and mounted on a travelling platform 59b which is used during repairs. The tuyère member for drum C is removable to permit renewal of the lining.

Continuity of the process can be attained without difficulty by correspondingly dimensioning the chambers A, B, C, D as to length and imparting properly related speeds to them. Instead of being superposed as shown, the pretreating chamber A may also be disposed on the side or in front of the smelting, fining and refining drums axially fitting into one another. In this case, the transition chamber E would remain; though slightly changed in structure.

What I claim as new and desire to secure by Letters Patent is:

1. The method of treating ores for the production of iron and steel which comprises providing an elongated tapering smelting chamber disposed horizontally, introducing in a whirling smelting flame at the smaller end of the chamber finely disintegrated ore with air and carrying the whirling flame and ore along the surface of the chamber wall toward the larger end thereof while rotating the chamber on its long axis, collecting the smelted ore in a receiving chamber and effecting the removal of slag, then discharging the molten metal directly into a stone lined purifying chamber and blowing oxygenated air through the molten metal while causing the same to flow in a shallow stream over said stone lining.

2. The method as set forth in claim 1 with the additional step of introducing coarser particles of preheated ore into said first chamber adjacent to the smaller end thereof.

3. The method as set forth in claim 1 with the additional step of utilizing heat from the wall of the first mentioned chamber for drying and preheating ore to be subsequently introduced for smelting by moving said ore in a closed jacket around the first chamber from the larger to the smaller end of the first chamber.

4. The method for the continuous treatment of ores for the production of iron and steel which comprises first subjecting the disintegrated ore to a drying and roasting, then subjecting the ore to the action of a reducing flame, then redisintegrating the ore and carrying the same in a state of fine subdivision into the smaller end of an elongated tapered smelting chamber in a whirling smelting flame directed axially through the chamber, carrying the smelted ore from the other end of the said chamber into a collecting chamber and removing slag, then flowing the molten metal in a thin stream from the collecting chamber through a fining chamber and subjecting the thin stream to blasts of oxygenated air.

5. The method as set forth in claim 4 with the added step of mixing coal with the ore while the ore is subjected to the action of the reducing flame.

6. The method of treating ores for the production of iron and steel which comprises the continuous and uninterrupted steps of moving the disintegrated ore through an elongated closed area while subjecting the ore to the action of a flame for the purpose of drying and roasting the ore, continuing the movement of the roasted ore through a continuing but larger area through which said flame passes for reducing the ore, effecting the redisintegration of the ore into fine and coarser particles, injecting said fine particles with air and a smelting flame under pressure axially into the smaller end of a horizontally disposed elongated smelting chamber along the wall of which the whirling smelting flame travels toward the opposite end of the chamber, removing the molten metal from the said opposite end of the smelting chamber and removing slag therefrom, and flowing the molten metal in a thin stream through a fining chamber while forcing oxygenated air through the metal.

7. The method as set forth in claim 6 with the added step of preheating the coarser particles of the redisintegrated ore by moving the same over and in contact with the exterior of the smelting chamber from the larger to the smaller end thereof and then introducing the preheated coarser ore particles into the smelting chamber adjacent the smaller end thereof to be acted upon by said whirling flame.

8. The method as set forth in claim 6 with the added step of introducing coal for admixture with the roasted ore in the reducing zone for the ore.

JULIUS LOHSE.